United States Patent [19]

Siegmeier et al.

[11] Patent Number: 4,851,556
[45] Date of Patent: Jul. 25, 1989

[54] PROCESS FOR THE PREPARATION OF EPOXIDIZED POLYBUTADIENES

[75] Inventors: Rainer Siegmeier, Frankfurt am Main; Andreas Grund, Darmstadt; Guenter Prescher; Udo Brandt, both of Hanau, all of Fed. Rep. of Germany

[73] Assignee: Degussa Aktiengesellschaft, Frankfurt, Fed. Rep. of Germany

[21] Appl. No.: 163,239

[22] Filed: Mar. 2, 1988

Related U.S. Application Data

[63] Continuation of Ser. No. 884,938, Jul. 14, 1986, abandoned.

[30] Foreign Application Priority Data

Aug. 5, 1985 [DE] Fed. Rep. of Germany ....... 3528007

[51] Int. Cl.$^4$ ........................................... C07D 301/14
[52] U.S. Cl. ..................... 549/525; 549/526; 549/527; 549/541
[58] Field of Search ................ 549/525, 541, 526, 527

[56] References Cited

U.S. PATENT DOCUMENTS

| 3,030,336 | 4/1962 | Greenspan et al. | 260/47 |
| 3,351,635 | 11/1967 | Koller et al. | 549/529 |
| 3,458,536 | 7/1969 | Setzler | 549/541 |
| 4,059,619 | 11/1977 | Prescher et al. | 260/502 R |
| 4,101,570 | 7/1978 | Kruger et al. | 260/502 R |
| 4,113,747 | 9/1978 | Prescher et al. | 549/541 |
| 4,137,242 | 1/1979 | Prescher et al. | 549/541 |

FOREIGN PATENT DOCUMENTS

| 56932 | 8/1982 | European Pat. Off. ............ 549/525 |
| 61393 | 9/1982 | European Pat. Off. . |
| 90239 | 3/1983 | European Pat. Off. . |
| 1173658 | 7/1964 | Fed. Rep. of Germany ...... 549/525 |
| 2519289 | 11/1976 | Fed. Rep. of Germany . |
| 2519290 | 11/1976 | Fed. Rep. of Germany . |
| 2752920 | 5/1979 | Fed. Rep. of Germany ...... 549/525 |
| 1203463 | 8/1983 | Fed. Rep. of Germany . |
| 1048318 | 11/1966 | United Kingdom ................ 549/525 |
| 1518227 | 7/1978 | United Kingdom . |
| 2008593 | 6/1979 | United Kingdom . |
| 2019845 | 11/1979 | United Kingdom . |
| 2109797 | 6/1983 | United Kingdom . |

OTHER PUBLICATIONS

Hackh's Chemical Dictionary, 1969, p. 498.

Primary Examiner—Richard L. Raymond
Attorney, Agent, or Firm—Beveridge, DeGrandi & Weilacher

[57] ABSTRACT

Epoxidized polybutadienes with an average molecular weight of 500 to 100,000 and a certain content of epoxide oxygen were prepared from the corresponding polybutadienes with use of perpropionic acid in a benzene solution. The solution can also be employed in unpurified form with maximum contents of 1.5 weight percent hydrogen peroxide 1.5 weight percent of water, and about 800 ppm of mineral acid.

5 Claims, 2 Drawing Sheets

PROCESS FOR THE PREPARATION OF EPOXIDIZED POLYBUTADIENES

This application is a continuation of application Ser. No. 884,938 filed July 14, 1986, now abandoned.

The invention relates to a process for the preparation of epoxidized polybutadienes with a percarboxylic acid in an organic solution and the processing of the reaction mixture thus formed.

Epoxidized polybutadienes have found an exceptionally wide range of application in practice. In this regard, the coating of various surfaces such as paper, wood, metal, or silicon wafers is of greatest significance. Depending on the composition of the lacquers combined with the epoxidized polybutadienes, the said lacquers are cured with use of thermal and electrical energy and also with electromagnetic radiation.

Because polybutadienes are also classified as olefins, their epoxidation with percarboxylic acid—in the sense of the Prileschajew reaction—is known in the art. Thus, performic or peracetic acid are frequently employed, and not only is performic acid in situ used, but occasionally also peracetic acid in situ is used (cf. West German DE-OS No. 25 54 093, British GB-PS No. 2 113 692, U.S. Pat. No. 4,309,516, Japanese patent applications Nos. 76/126292 and 76/93998).

However, the said two percarboxylic acids have the major drawback that the carboxylic acids formed during the reaction with polybutadiene, namely formic and acetic acid, are reactive and can also form cross-linked products via secondary reactions. The latter are then no longer soluble in the organic solvents employed. Monoperphthalic acid was then suggested (cf. French patent application No. 2 320 972 and West German DE-OS No. 25 42 709).

The disadvantages of this process are related to the fact that the precipitating phthalic acid must be removed from the reaction mixture by filtration at considerable expense. Furthermore, considerable quantities of solvents for dilution are needed for the precipitated process, and these can also contain as yet unreacted per acid.

The very low concentration, which does not make the process economically feasible on a commercial scale, is striking in this process.

If, in addition to performic or peracetic acids, even perbutyric and perpelargonic acids were employed as the aliphatic percarboxylic acids with up to 10 carbon atoms, perpropionic acid specifically was not employed for epoxidation of polybutadiene (cf. U.S. Pat. No. 2,851,441).

The solvents for the percarboxylic acids in the above mentioned known processes were limited either to water or ester or ether.

If water was employed, a two phase system always resulted, which, as is know, creates technical difficulties in handling, for example, due to a disadvantageous distribution of the product in the two phases (U.S. Pat. No. 2,851,441).

If ethers are employed in the presence of hydrogen peroxide or percarboxylic acids, there is the danger of peroxide formation. With esters as the solvent, perhydrolysis can occur.

Therefore, the present invention has as its object to provide an epoxidation process for polybutadienes, which can be simply carried out while avoiding by product formation. This is accomplished by means of a solvent system present in a homogeneous medium.

It has now been found that epoxidized polybutadienes which have an average molecular weight of 500 to 100,000 and a content of 1 to 20 weight percent of epoxide oxygen per 100 g of diene polymer can be obtained in a technically simple manner and in a homogeneous medium with a percarboxylic acid, if polybutadienes are reacted with a solution of perpropionic acid in benzene at a molar ratio of 1:1.0 to 1:1.3 (double bond to be epoxidized to perpropionic acid) at a temperature of 10° C. to 100° C., preferably 20° C. to 50° C., and the liberated propionic acid is separated after the reaction by distillation or by distillation and desorption, returned to the process of preparing perpropionic acid as desired, and the obtained epoxidized polybutadiene is isolated.

Both homo- and copolymers of conjugated dienes are suitable as polybutadienes; however, homopolymers, particularly those of the polybutadiene, are preferred.

The said conjugated dienes include 1,3-butadiene, isoprene, 2,3-dimethyl-1,3-butadiene, and chloroprene.

The dienes can have a 1,4- or 1,2-linkage. However, mixtures of 1,4- and 1,2-linkages may also be present, wherein the 1,4-linkage can assume a cis and trans configuration.

Reactants in a copolymerization to form copolymers are, for example, styrene or substituted styrene, vinyl esters, acrylic esters, or methacrylic esters.

Perpropionic acid can be prepared, for example, according to a process disclosed in West German patent DE-PS No. 25 19 289 by reacting aqueous hydrogen peroxide with propionic acid in the presence of sulfuric acid, then extracting the resulting perpropionic acid with benzene from the reaction mixture. The perpropionic acid in benzene solution obtained thereby can be purified still further to reduce the residual content of sulfuric acid, water, and hydrogen peroxide (cf. West German Patent DE-PS No. 25 19 290). However, a perpropionic solution is preferred that requires no further purification; in other words, the crude extract from the preparation of perpropionic acid can be used directly as such. This results in a considerably reduced technical expenditure.

Therefore, a perpropionic acid solution in benzene can be used that contains up to 1.5 weight percent of hydrogen peroxide, 1.5 weight percent of water, and up to 800 ppm of mineral acid.

According to the process incorporating the invention, the polybutadienes are preferably used as such, but also diluted in a suitable solvent, e.g., benzene, whereby a wide range of concentrations can be freely selected.

The perpropionic acid solutions, which include, inter alia, propionic acid, can contain from 10 to 30 weight percent of the per acid. Preferably, solutions with a per acid content of about 20 weight percent are employed. A preferred ratio of polybutadiene to perpropionic acid is 1:1.0 to 1:1.3 (double bond to be epoxidized to perpropionic acid). An excess of per acid of 3 to 15 mole percent is especially preferred.

The novel process can be run at various pressures; in general, standard pressure is used, but the process can also be run at excess or subatmospheric pressure.

The reaction can be run both as a batch and continuous process in reactors suitable for this type reaction, such as agitated kettles, agitated kettle cascades, and tubular or loop-type reactors, whereby the heat of the reaction can be removed in any manner, e.g., by evaporative cooling or in internal or external cooling equipment.

For example, glass, special steel, or enameled material are suitable as the fabrication materials for the reactors for carrying out the process embodying the invention.

The perpropionic acid is combined with the polybutadiene or the solution thereof in any way desired. For example, both reactants can be introduced into the reactor together or in succession in any order of sequence. In a batch operating mode, the polybutadiene is preferably introduced first and the per acid is metered in while the reaction temperature is monitored. However, the reaction can also be performed in the reverse order, i.e., the per acid is charged first and the olefin is metered in with temperature monitoring. When the reaction is run in this manner, however, the epoxy groups are not distributed randomly on the polymer chains. If the reaction is run continuously, both reactants can be fed into the reactor separately or together. If several series connected reactors are used, such as, for example, an agitated kettle cascade or a series of agitated kettles with a tubular reactor as the subsequent reactor, both the charges of the per acid and polybutadiene can be distributed over several reactors. Toluene, chlorobenzene, or halogenated aliphatics can be used, in addition to the preferred benzene, to dissolve the polybutadiene.

According to the process of the invention, a continuous mode of operation is very advantageous. According to this mode, the polybutadiene or the solution thereof is charged with a solution of perpropionic acid in benzene at a molar ratio of 1:1.0 to 1:1.3 per double bond to be epoxidized, at the indicated temperatures of 10° C. to 100° C. to a reactor system, which consists of a series of 1 to 4 ideally mixed reactors and a subsequent reactor, whereby the residence time is adjusted so that the conversion, based on the number of double bonds to be epoxidized, is at least 80 mole percent downstream of the ideally mixed reactor(s) and at least 95, preferably over 98, mole percent downstream of the subsequent reactor. Then, the reaction mixture leaving the subsequent reactor is liberated in a combination of distillation and desorption steps from benzene, propionic acid, unreacted perpropionic acid, and other volatile components. This separation of the reaction mixture can be carried out according to one of the following variants, because the resulting polyepoxide is the component with the highest boiling point in the mixture.

The invention is further illustrated by the drawings, wherein.

The following is a detailed description of the invention including various embodiments thereof with reference to the accompanying drawings.

Embodiment 1 (Batch Process)

According to this embodiment, the individual components of the reaction mixture are removed in the order of their respective boiling points, individually or as a mixture by distillation or by distillation and desorption. In this process, the fractions of benzene, residues of perpropionic acid, propionic acid, and other readily volatile components are easily removed. The polyepoxide remains as the bottoms If desired, the separated benzene and the propionic acid can be returned to the per acid synthesis after additional purification steps.

Figure 1:
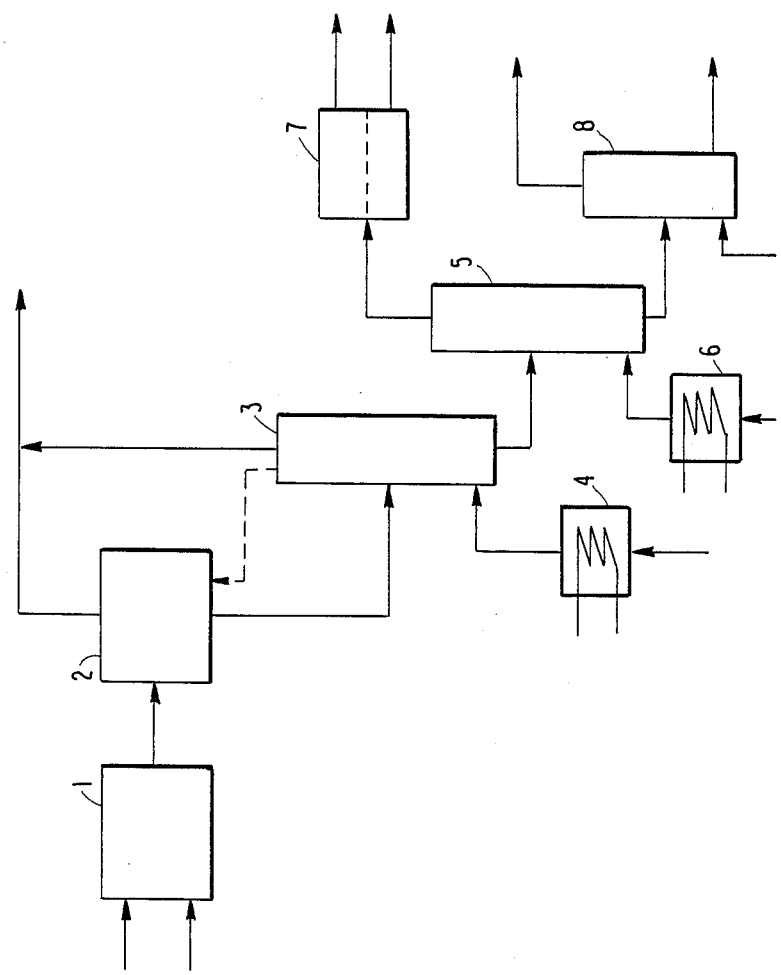
FIG. 1 is a flow diagram for a continuous process according to the invention.

Embodiment 2 (Continuous Process, FIG. 1)

According to this continuous variant of the process and as illustrated in FIG. 1, after the reaction mixture has left reaction unit 1, most of the benzene, propionic acid, and unreacted perpropionic acid are first removed in the one- or multistage distillation unit 2. Suitable for distillation devices are thin film, falling film, or circulation evaporators. Advantageously, distillation is effected at a reduced pressure of 0.5 to 600, preferably 10 to 300, mbar (temperature of the heating medium is 50° C. to 150° C.). Average residence times, based on the individual evaporation stages, are a maximum of 10 minutes, residence times of a maximum of 5 minutes being preferred.

According to the process of the invention, any amount of propionic acid remaining in the crude product is then removed by desorption in desorption unit 3 with benzene vapor that is generated in evaporator 4. The vapors from desorption unit 3 can either be conducted past distillation unit 2 or be passed therethrough. After this step, any remaining traces of benzene are desorbed from the polyepoxide with steam from evaporator 6 in desorption unit 5 and/or with nitrogen or other inert gases in desorption unit 8. It is especially preferred to desorb first with steam, then with inert gases. The condensate from desorption unit 5 separates in phase separator 7 into an organic phase and water. The water is returned to evaporator 6, after enrichment, if necessary. The organic phase, which contains mostly benzene and propionic acid, is returned to perpropionic acid synthesis or to epoxidation after further processing, if necessary. Likewise, the streams of condensate consisting primarily of benzene and unreacted perpropionic and propionic acids and originating from distillation of desorption units 2 and 3, are returned, after further separation—cf. FIG. 3—which will be described below; to per acid synthesis or to epoxidation.

In all examples, devices such as, for example, the falling film evaporator, Sambay evaporator, columns with built in packing or fill packing material, or similar means that enable proper mass transfer between gaseous and liquid states and are known to those skilled in the art are suitable as the desorption unit.

Figure 2:
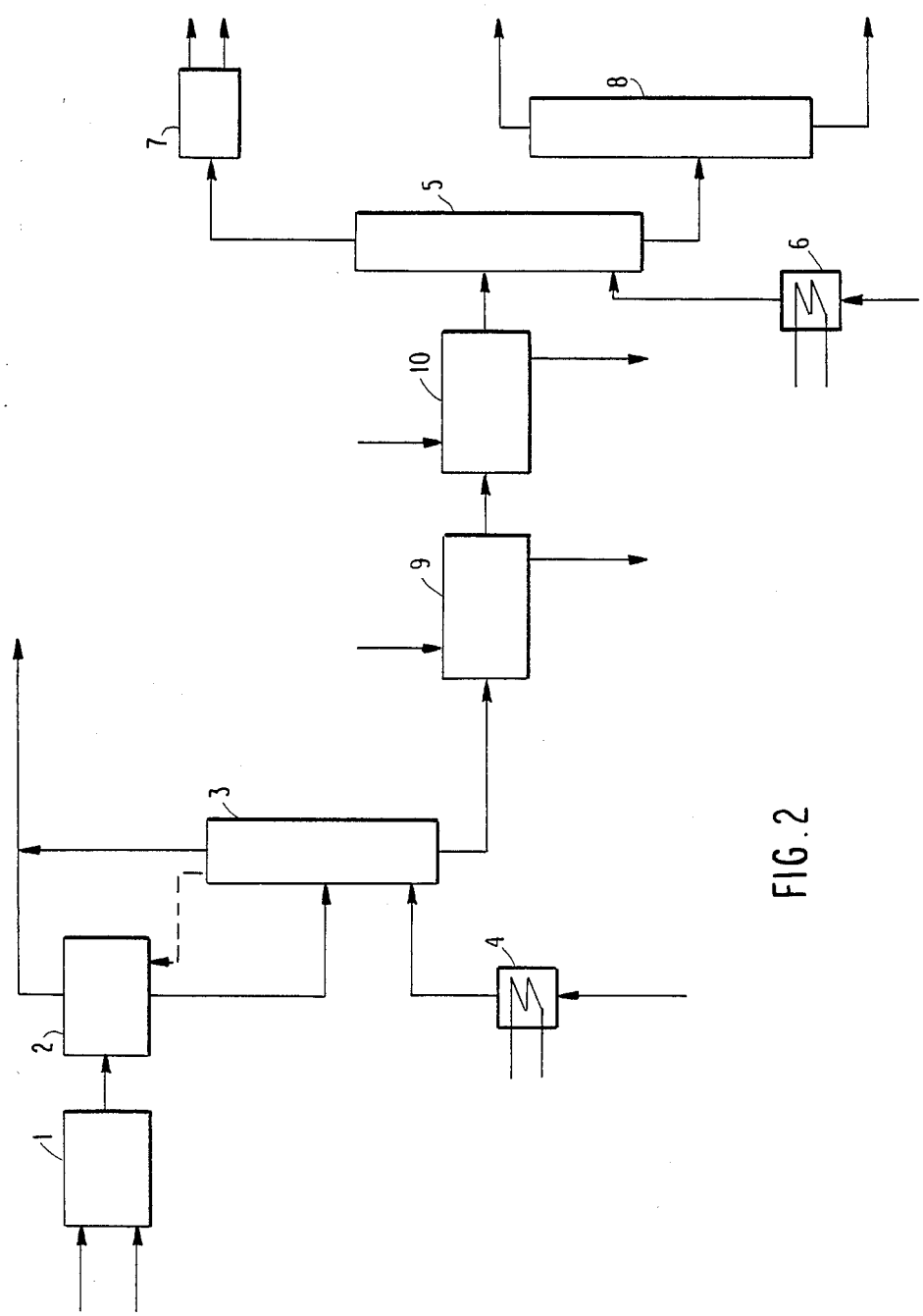
FIG. 2 is a flow diagram for a different continuous process according to the invention.

Embodiment 3 (Continuous Process, FIG. 2)

According to the third embodiment to be used in a continuous manner, benzene, unreacted perpropionic acid, and propionic acid, as in Embodiment 2, are removed in the one—or multistage distillation unit 2. Then, the remaining propionic acid is desorbed with benzene vapor in desorption unit 3. To remove the remaining traces of propionic acid, the crude epoxide is now washed with aqueous alkalies in the extraction 9, and then with water in the one- or multistage extraction unit 10. Suitable devices for these steps are various types of extraction columns or mixer settler units as well. The method of operation and design of such apparatus are well known to workers in the art. Solutions of, for example, NaOH, KOH, $Na_2CO_3$, $K_2CO_3$, $NaHCO_3$, $KHCO_3$, $NH_3$, etc., are suitable as aqueous alkali solutions, the concentrations of which can be freely selected over a wide range. An NaOH solution with a concentration of 0.2 to 15 weight percent, preferably 0.5 to 1.0 weight percent, is particularly preferred.

If mixer settler units are used for the water wash, the water can be supplied countercurrently, but each unit can also be operated with fresh water. Advantageously, a portion of the waste water from the mixer settler is used to prepare the alkali solution. The alkali and water washes can be carried out in a temperature range of 10° C. to 90° C.; temperatures between 30° C. to 70° C. are preferably. In the alkali wash, the weight ratio of the treated epoxide to alkali solution is 1:1 to 100:1 in the water wash, the ratio of epoxide flow rate to water flow rate is 1:1 to 100:1.

The water wash is followed by further progressing by desorption with steam and/or inert gas as described in Embodiment 2. The obtained crude epoxide can be diluted with, for example, benzene before the wash.

Figure 3:
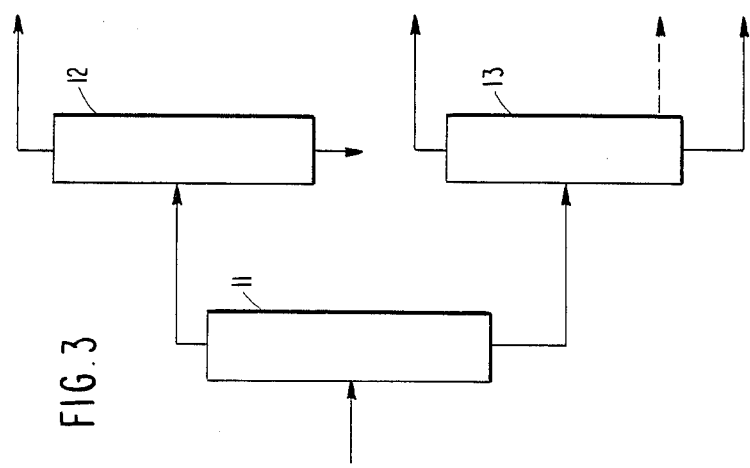
FIG. 3 is a flow diagram of a distribution system according to the invention.

In all embodiments of the invention resulting from a combination of distillation and desorption steps, condensates are obtained which are composed mainly of benzene, unreacted perpropionic acid, and other light boiling substances. According to the process of the invention, then materials are transferred to distillation unit 11 consisting of one or more columns (FIG. 3). This unit produces benzene as the overhead and in some cases other light boiling substances. In certain cases, the former is returned, after further distillation, to unit 12 for the preparation of perpropionic acid. A mixture of propionic acid, perpropionic acid, and benzene with benzene proportions of 5 to 35 weight percent referred to the bottoms mixture, accumulates in the bottom of distillation unit 11. This mixture is fed to another distillation unit 13, in which the total amount of added benzene and perpropionic acid with portions of propionic acid is drawn off at the top. In so doing, a concentration of perpropionic acid in the distillate of 25 weight percent is not exceeded. This overhead is returned to the process of preparing perpropionic acid or to the reaction of the polybutadiene with perpropionic acid. Propionic acid is obtained as bottoms in column 13. After further processing such as by high purity distillation, the propionic acid is recycled to the preparation of perpropionic acid, after supplementing if necessary. It is of particular advantage to draw off the propionic acid obtained in unit 13 as a vapor above the bottoms and to condense it, thereby dispensing with one more purification step.

According to the invention, all distillation processing steps are preferably carried out at reduced pressure, e.g., 0.5 to 600 mbar. Columns in which benzene or propionic acid is obtained as overhead can likewise be run at standard pressure.

The novel process offers a series of surprising advantages. According to this process, it is possible via the so-called Prileschajew reaction to produce the above mentioned epoxidized polybutadienes on a commercial scale safely and with high yields. The product thus obtained is distinguished by its exceptional purity, high epoxide content, low viscosity, lack of odor, and light color.

The content of ionic contaminants is also very low, as a result of which a product becomes available with clearly better properties than polyepoxides produced by other processes, with the above mentioned structure. It is particularly advantageous that the degree of epoxidation can be adjusted to fall between 0 and 100% by selecting the appropriate molar ratio "double bond to perpropionic acid". The range of 5 to 50%, but especially that of 20 to 40%, preferred.

The process described herein is economical, since all auxiliary agents are recycled. The process is by no means harmful to the environment, because only water is the waste product from the oxidation agent. Moreover, only small amounts of other light boiling substances, and distillation residues are obtained, which can be disposed of safely and without serious problems.

According to the invention, only short reaction times are necessary, which makes the commercial operation highly cost effective.

It is surprising and unforeseeable that the reaction of the above mentioned polybutadiene with a crude perpropionic acid, which still contains mineral acid, water, and hydrogen peroxide in the concentrations mentioned above, can be carried out, and that side and secondary reactions are suppressed to the highest degree possible. Furthermore, it was unforeseeable that the reaction mixture thus obtained can be processed according to the invention by distillation or by distillation and desorption, without markedly reducing the epoxide content of the product.

The invention is further illustrated and described in the following examples.

EXAMPLE 1

(BATCH)

1350 g (3.3 moles) of perpropionic acid (22 weight percent) in benzene was added to 542 g of polybutadiene (microstructure: 67.2% 1,2-linkage; 15.6% trans-1,4-linkage, 16.7% cis-1,4-linkage), diluted with a 45 minute period. The perpropionic acid was prepared according to the process disclosed in West German Patent DE-PS No. 25 19 289 and contains 0.56 weight percent of $H_2O_2$, 0.88 weight percent of $H_2O$, and 540 ppm of $H_2SO_4$. This perpropionic acid was used in Examples 1 to 4. Stirring continued for 150 minutes at 30° C.. The conversion of the per acid at this point was 97.5%. The clear, pale yellow solution thus obtained was passed through a thin film evaporator over a 270 minute period at 90° C. and a pressure of 100 mbar, during which about 220 g/hour of benzene vapor was introduced countercurrently at the same time. The crude epoxide thus obtained was now passed through the thin film evaporator at 90° C./20 mbar; a weak nitrogen stream was passed countercurrently. 623 g of a pale yellow epoxypolybutadiene with an epoxide content of 32.1% was obtained as the bottoms.

EXAMPLE 2

(CONTINUOUS)

722 g of perpropionic acid in benzene (about 22 weight %) and 382.5 g of polybutadiene (according to Example 1), dissolved in 400 ml of benzene, (which corresponds to a molar ratio of per acid to double bonds present of 1.0:4) were charged hourly to the first agitated kettle of a reaction unit consisting of two agitated kettles each with a volume of 1500 ml and a subsequent reactor designed as a tubular reactor with a volume of 790 ml.

The reaction temperature in reactor 1 was 40° C., in reactor 2 it was 42° C., and in the subsequent reactor it was 50° C. Conversions of per acid were 91.3% downstream of the agitated kettle cascade, and 98.1% downstream of the tubular reactor. According to Process Embodiment 2, benzene, perpropionic acid, and propionic acid were separated first in a Sambay evaporator with a surface area of 0.065 m² at a temperature of 90°

C. and a pressure of 100 mbar. The residual propionic acid was desorbed in a second evaporator of the same type and same surface area at 90° C. and 100 mbar at a flow rate of 290 g/h of benzene vapor. All vapors from evaporator 2 are passed through evaporator 1 countercurrently to the product stream. Subsequently, the epoxide was treated in two desorption units, each consisting of a Sambay evaporator (surface area of 0.065 m$^2$), at 100 mbar with 43 g/h of water and at 20 mbar with 27 g/h of nitrogen at temperatures of 90° C. 417.7 g of epoxidized polybutadiene was obtained hourly as product with the following characteristics:

Epoxide content (equivalents/kg): 4.28 ≙ epoxidation degree of 24.5%.

EXAMPLE 3
(CONTINUOUS)

494.3 g of perpropionic acid in benzene (about 22 weight %) and 314.5 g of polybutadiene (which corresponds to a molar ratio of per acid to double bonds present of 1.0:4.8) were charged hourly to the first agitated kettle of a reaction unit consisting of two agitated kettles each with a volume of 1500 ml and a subsequent reactor designed as a tubular reactor with a volume of 790 ml.

The reaction temperature in reactor 1 was 51° C., in reactor 2 it was 52° C., and in the subsequent reactor it was 58° C. Conversions of per acid were 92.6% downstream of the agitated kettle cascade, and 98.8% downstream of the tubular reactor. According to Process Embodiment 2, benzene, perpropionic acid, and propionic acid were separated first in a Sambay evaporator with a surface area of 0.065 m$^2$ at a temperature of 90° C. and a pressure of 100 mbar. The residual propionic acid was desorbed in a second evaporator of the same type and same surface area at 90° C. and 100 mbar at a flow rate of 330 g/h of benzene vapor. The vapors from evaporator 2 were not passed through evaporator 1.

Subsequently, the epoxide was treated in two desorption units, each consisting of a Sambay evaporator (surface area of 0.065 m$^2$), at 100 mbar with 41 g/h of water and at 20 mbar with 32 g/h of nitrogen at temperatures of 90° C. 336.4 g of epoxidized polybutadiene was obtained hourly as product with the following characteristics:

Epoxide content (equivalents/kg): 3.67 ≙ epoxidation degree of 20.5%.

EXAMPLE 4
(CONTINUOUS)

783 g of perpropionic acid in benzene (about 22 weight %) and 314.4 g of polybutadiene, dissolved in 290 ml of benzene, (which corresponds to a molar ratio of per acid to double bonds present of 1.0:3.04) were charged hourly to the first agitated kettle of a reaction unit consisting of two agitated kettles each with a volume of 1500 ml and a subsequent reactor designed as a tubular reactor with a volume of 1900 ml.

The reaction temperature in reactor 1 was 41° C., in reactor 2 it was 40° C., and in the subsequent reactor it was 50° C. Conversions of per acid were 91.8% downstream of the agitated kettle cascade, and 98.6% downstream of the tubular reactor. According to Process Embodiment 3, benzene, perpropionic acid, and propionic acid were separated first in a Sambay evaporator with a surface area of 0.065 m$^2$ at a temperature of 90° C. and a pressure of 100 mbar. The residual propionic acid was desorbed in a second evaporator of the same type and same surface area at 90° C. and 100 mbar at a flow rate of 308 g/h of benzene vapor. The vapors were passed as in Example 3. The crude epoxide thus obtained as bottoms was then diluted with about 450 ml/hour of benzene and washed in a mixer settler system with 0.1% sodium hydroxide solution (410 ml/hour) and then washed with water in a series of three mixer-settler units (180 ml/hour in each case). Subsequently, the epoxide was treated in two desorption units, each consisting of a Sambay evaporator (surface area of 0.065 m$^2$), at 100 mbar with 39 g/hour of water and at 20 mbar with 35 g/hour of nitrogen at temperatures of 90° C. 357.1 g of epoxidized polybutadiene was obtained hourly as product with the following characteristics:

Epoxide content (equivalent/kg): 5.71 ≙ epoxidation degree of 32.5%.

The polybutadiene employed in Examples 3 and 4 corresponded to that in Example 1.

Variations and modifications of the foregoing will be apparent to those skilled in the art and are intended to be encompassed by the claims appended hereto.

We claim:

1. A process for the preparation of epoxidized polybutadienes from polybutadienes which have an average molecular weight of 500 to 100,000 and a content of 1 to 20 weight percent of epoxide oxygen per 100 g of diene polymer, comprising reacting a polybutadiene with a solution of perpropionic acid at a concentration of 10–30% by weight in benzene at a molar ratio of 1:1.0 to 1:1.3 (double bond to be epoxidized to perpropionic acid), comprising charging the polybutadiene to a reaction system consisting of a series of 1 to 4 ideally mixed reactors and a subsequent reactor, controlling the reaction at a temperature of 10° C. to 100° C., adjusting the residence time so that the conversion, based on the member of olefin double bonds to be epoxidized, is at least 80 mole percent downstream to the ideally mixed reactor(s) and over 98 mole percent downstream of the subsequent reactor, and separating the liberated propionic acid by a combination of distillation and desorption after the reaction to recover the desired product comprising removing benzene, propionic acid, small amounts of perpropionic acid, and other low boiling substances from the mixture emerging from the subsequent reactor in a combination of distillation and desorption steps, wherein the distillation and desorption steps are carried out at reduced pressure of 10 to 300 mbar at temperatures of the heating medium of 50° C. to 150° C. and with residence time of a maximum of 5 minutes, in the separate steps, wherein initially benzene and propionic acid, as well as small amounts of perpropionic acid, are removed for the most part by distillation, and residual propionic acid remaining in the crude epoxide is further removed by desorption with benzene vapor, immediately thereafter driving off any remaining traces of the benzene and traces of propionic acid with steam and/or inert gases, and optionally following desorption with benzene vapor the crude polyepoxide, after optional dilution with benzene, is initially washed with aqueous alkalies, then washed with water, and only then the desorption with steam and/or inert gases is performed, wherein the perpropionic acid is prepared by reacting aqueous hydrogen peroxide with propionic acid in the presence of sulfuric acid, and then extracting the resulting perpropionic acid with benzene from the reaction mixture, wherein the perpropionic acid solution is the crude extract from the preparation of perpropionic acid which contains hydrogen peroxide, water and mineral acid and has a maximum content of 1.5 weight percent of hydrogen peroxide, 1.5 weight percent of water, and about 800 ppm of mineral acid.

2. The process according to claim 1, wherein the reaction temperature is 20° C. to 50° C.

3. The process according to claim 1, wherein the mixture obtained by the combination of distillation and desorption steps and consisting of benzene, propionic acid, small amounts of perpropionic acid, and any other low boiling substances, is conducted to a distillation unit consisting of two or more distillation columns, and in which there is a unit (12) for the process of preparing perpropionic acid, and thereafter benzene, and any other low boiling substances, is removed at the top in a first distillation step, and the former is returned to unit (12) for the process of preparing perpropionic acid after further distillation, and the total amount of perpropionic acid and propionic acid, as well as the portions of benzene at the bottom in amounts of 5 to 35 weight percent referred to the bottoms mixture, is removed, and the said bottoms mixture is passed to a second distillation step in which the total amount of the benzene and perpropionic acid contained therein with the portions of the propionic acid is removed at the top and in so doing a concentration of perpropionic acid in the overhead product of more than 25 weight percent is not exceeded, said overhead product being returned to the reaction of perpropionic acid with polybutadiene, and the propionic acid being drawn off as a vapor above the bottoms and condensed, is returned to unit (12) for the process of preparing perpropionic acid.

4. The process according to claim 1, wherein the mixture obtained by the combination of distillation and desorption steps and consisting of benzene, propionic acid, small amounts of perpropionic acid, and any other low boiling substances, is conducted to a distillation unit consisting of two or more distillation columns, and in which there is a unit (12) for the process of preparing perpropionic acid, and thereafter benzene and any other low boiling substances, is removed at the top in the first distillation step and the former is returned to unit (12) for the process of preparing perpropionic acid after further distillation, and the total amount of perpropionic acid and propionic acid, as well as the portions of benzene at the bottom in amounts of 5 to 35 weight percent referred to the bottoms mixture, is removed, and said bottoms mixture is passed to a second distillation step in which the total amount of the benzene and perpropionic acid contained therein with the portions of propionic acid is removed at the top and in so doing a concentration of perpropionic acid in the overhead product of more than 25 weight percent is not exceeded, said overhead product being returned to unit (12) for the process of preparing perpropionic acid, and the propionic acid being drawn off as a vapor above the bottoms and condensed, is returned to unit (12) for the process of preparing perpropionic acid.

5. The process as claimed in claim 1, wherein the perpropionic acid solution contains about 22 weight percent perpropionic acid, about 0.56 weight percent hydrogen peroxide, about 0.88 weight percent water and about 540 ppm sulfuric acid as mineral acid.

* * * * *